United States Patent [19]

Ugon

[11] 4,382,279
[45] May 3, 1983

[54] SINGLE CHIP MICROPROCESSOR WITH ON-CHIP MODIFIABLE MEMORY

[75] Inventor: Michel Ugon, Plaisir, France

[73] Assignee: Compagnie Internationale pour l'Informatique CII-Honeywell Bull (Societe Anonyme), Paris, France

[21] Appl. No.: 207,463

[22] Filed: Nov. 17, 1980

Related U.S. Application Data

[63] Continuation of Ser. No. 30,548, Apr. 16, 1979, abandoned.

[30] Foreign Application Priority Data

Apr. 25, 1978 [FR] France .............................. 78 12119

[51] Int. Cl.$^3$ ................................................ G06F 9/00
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,792,441 | 2/1974 | Wymore et al. | 364/200 |
| 4,128,873 | 12/1978 | Lamiaux | 364/200 |
| 4,153,933 | 5/1979 | Blume, Jr. et al. | 364/200 |

OTHER PUBLICATIONS

Osborne, A. et al., "An Introduction to Microcomputers", vol. II, Jun. 1977, pp. 1-1 to 1-21.

Primary Examiner—Raulfe B. Zache
Attorney, Agent, or Firm—Kerkam, Stowell, Kondracki & Clarke

[57] ABSTRACT

A microprocessor architecture which permits automatic programming of a non-volatile memory included on the same chip as a processing and control unit. The microprocessor includes a permanent memory such as an EPROM which can be electrically written word by word. The microprocessor additionally includes a processing and control unit connected to the permanent memory through two sets of data and address registers. Circuits are also included for distributing memory write voltage in a manner which does not interfere with normal operation of the microprocessor. As a result, the data contents at one memory location can be modified (written) the same time instructions are being read from another memory location. Memory writing can alternatively be effected by a sub-program comprising a sequence of microinstructions, or by a write automaton comprising hard-wired logic circuits.

14 Claims, 7 Drawing Figures

SINGLE CHIP MICROPROCESSOR WITH ON-CHIP MODIFIABLE MEMORY

This application is a continuation of application Ser. No. 30,548, filed Apr. 16, 1979.

BACKGROUND OF THE INVENTION

The present invention relates to a novel architecture for a microprocessor or microcomputer which offers an easy solution to the problems raised by automatic programming.

By automatic programming is meant all the possible ways which one program has of modifying another program. If a program $P_1$ is likened to a set of functions $f_i$ such that $P_1 = (f_1, f_2, \ldots f_i \ldots f_j)$, automatic programming has been achieved if $f_i$ is a sub-program capable of modifying the sub-program $f_j$. In this way program $P_1$ is converted into a program $P_2$ such that $P_2 = (f_1, f_2 \ldots f_i \ldots g_j)$. This characteristic can be extended step by step so that the entire program can be modified to perform jobs which are planned but which are entirely different from those defined by the original functions. Program $P_1$ thus evolves with time as a function of its own past history.

Automatic programming may give rise to extremely complex problems since it is necessary to predict in advance all the possible changes which the program may make in itself, although in many applications the possible changes in the program as a function of events are perfectly predictable.

In large data processing systems which employ large processors, automatic programming may lead to the use of memory space which is able to expand in step with the evolution in time of the original program. In cases where, in certain applications of microprocessors, the size of the memory is small, it is desirable that the original program, when evolved, should not take up any more memory space than at the beginning. One way of achieving this result comprises making changes in the content of the instructions or data at specific addresses in the original program, which changes may for example affect the contents of the zone for the operation code of a particular instruction in the original program. Thus, an original program $P_1$ which, at an address 10A, contains an instruction including an addition operation code could have its operation code converted into a subtraction code without the size of the original program being thereby altered. Similarly, an immediate operand may be altered to allow for a new value as a function of an event. It will be recalled that the operand field of an instruction contains an immediate operand when its content relates to an item of data and not to an address. This operand may be situated in an immediate instruction, but it may equally well form part of the permanent input data of the program. Thus, depending upon the change made to an immediate operand, the actions undertaken by the program will be different in the aftermath.

The technique of automatic programming may find highly diversified applications in systems which are tending to replace cash such as bank notes and coins, in systems where the completeness and confidentiality of information held in files must be ensured, in data processing systems where it is necessary to ensure that a program cannot be violated by external events, to allow specific functions to be performed on any programmable machine, in particular on computers or sophisticated small calculators, or in systems where access authorization and control are necessary. Thus, in a banking application, it may be necessary to memorize in succession the transactions performed on an account, to provide automatic protection against illicit access to the data on the memorized account, to control access to a memory device in which this data is situated by comparing a code with an item of data unavailable to an unauthorized user, and to modify the behavior of the memory device in relation to its external environment as a function of the history of the events which take place during the whole period over which it is used.

The arrangement according to the invention provides a solution to the difficult problem of storing the programs which are recorded in small programmable computers. There are in fact known designs of small computers which can be programmed by the user, but the chief drawback of these is that they are unable to preserve the recorded program in the absence of a power supply or energy source. This is why it is necessary to couple these computers, at the time of use, to recording media such as magnetic cards or fused memories from which the data which they contain can only be read out. In the existing state of the art these memories are known by the term Read Only Memory (ROM) and as low consumption Complementary Metal Oxide Semiconductor (CMOS) memories. These recording media are bulky, impractical and relatively expensive. The arrangement according to the invention solves these problems. Permanently recorded in a memory is a program which relates to the basic functions (the arithmetic function and conventional calculating function) of the small computer and a program which automatically translates into suitable program instructions functions which are fed in from the keyboard of the small computer by the user. Recorded in a reprogrammable memory portion or block are the various programs which are fed in by the user as a function of his needs and which evolve with time.

From the examples of applications which have just been given, it can be deduced that the corresponding memory arrangements need on the one hand to have very small physical dimensions and on the other hand to be provided with memory devices to preserve the data which is permanently recorded. The present day microprocessors which are produced by Large Scale Integration (LSI) techniques satisfy the first criterion of small size which is laid down in the above-mentioned applications. However, the monolithic structure usually contains only the control elements and the calculating elements which allow arithmetic and logic functions to be performed. Generally, the memory devices comprise another monolithic structure connected to the microprocessor. Practical examples of such microprocessors may be found in the book entitled "Les microprocesseurs, Techniques et applications" by Rodnay Zaks and Pierre Le Beux published by "SYBEX" 313 rue Lecourbe, 75015 PARIS.

Thus, if conventional means are used, to produce an automatically programmed memory device it is necessary to have at least one semiconductor chip on which are formed the structures of an arithmetic and logic unit and of a control member, and another chip on which the memory device is formed. The two chips are associated by means of a connection whose dimensions are by no means negligible as compared with the size of the two chips and associating them militates against satisfying the criterion of small size which was mentioned above.

The conventional memory which is used is intended to receive one or more programs as well as data; access to these programs and data being obtained by means of an address register which is used to indicate the location of an instruction or item of data in the memory, and by means of an output register which is loaded with the instruction or data item which is read from the memory at the address indicated by the address register.

In the applications mentioned above, it is important that it is possible to preserve the recorded information when supply voltage is withdrawn from the memory device. In addition, the need to modify the information (instructions and data) already memorized naturally leads to the use of non-volatile writable memories. In effect, a program recorded in permanent, non-writable and non-erasable memory of the Read Only Memory (ROM) type cannot, because of the very nature of the memory, be altered. On the other hand, a writable memory of the Programmable Read Only Memory (PROM) type readily lends itself to the various applications envisaged above because it is non-volatile and its contents can be altered at any time. It will be recalled that a PROM memory is a ROM memory which can be programmed directly by the user. Each cell in the memory is equipped with a fuse and programming is performed by blowing fuses in the memory. Other reprogrammable memories of the Erasable Programmable Read Only Memory (EPROM) type produced by Metal Oxide Semiconductor (MOS) fabrication techniques may also be used. However, PROM and EPROM memories suffer from limitations insofar as the above mentioned applications are concerned.

The association of memories of these two kinds with a conventional microprocessor makes it necessary to place all the parts of the microprocessor in a quiescent state when a write voltage is fed to one of the memories, which voltage can only come from outside the microprocessor. This means that no program can be run during this phase. Such an association makes it impossible for the memory to be automatically programmed by the microprocessor because the ordinal counter which is responsible for addressing the memory cannot simultaneously point to an address $A_i$ in the memory whose content is to be modified and to another address $A_j$ in the same memory in order to execute a sequence of writing in the memory zone situated at address $A_i$.

SUMMARY OF THE INVENTION

It is therefore an object of the invention to provide a novel monolithic microprocessor architecture in which nonvolatile automatic programming is possible by allowing its functions to evolve by building on the various previous states in the face of a given situation.

Briefly stated, and in accordance with one embodiment, a microprocessor according to the invention includes, on a single chip, a permanent memory into which data can be electrically written. Additionally, there is a means, controlled by a processing unit, for enabling data to be written in the memory. In one particular embodiment, the means for enabling data to be written in the memory simultaneously accesses a memory location at which data is to be modified and an instruction sequence enabling modified data to be written. The means for enabling data to be written further generates a write voltage signal appropriate for the particular programmable memory.

BRIEF DESCRIPTION OF THE DRAWINGS

The invention will be better understood from the following description which is given, by way of example, with reference to the drawings, in which.

DESCRIPTION OF THE PREFERRED EMBODIMENTS

Figure 1:
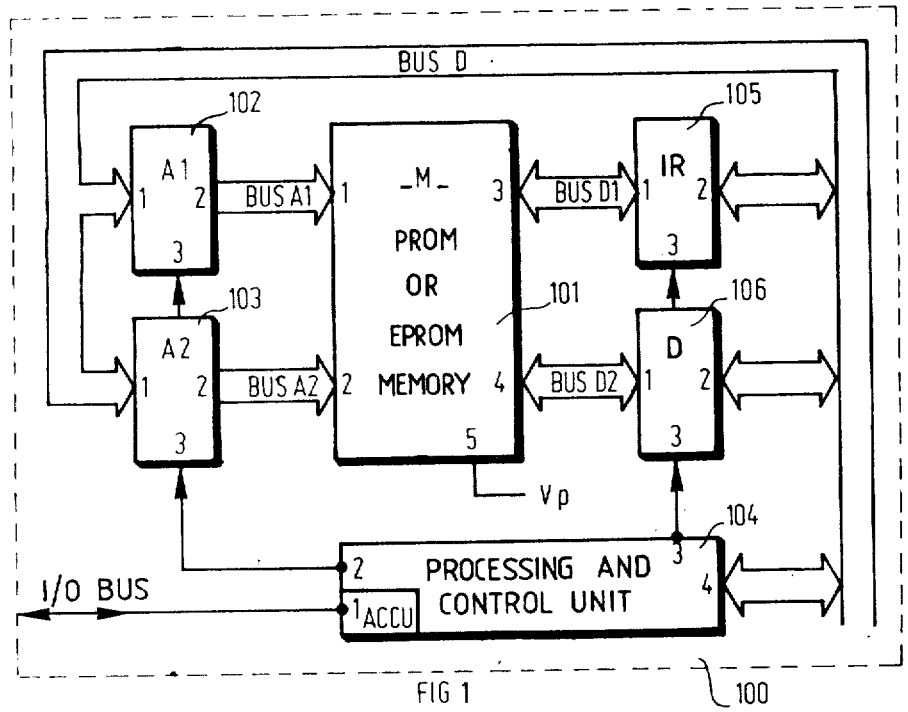
FIG. 1 is a general diagram illustrating the addressing of the memory of the automatically programmed microprocessor according to the invention.

In FIG. 1, a microprocessor 100 embodying the invention includes a PROM or EPROM memory 101 is addressed by registers A1 102 and A2 103. The memory 101 need have no specific capacity and it is, for example, possible to use a capacity of 4 K bytes, and each byte may be of eight-bit size. With this configuration, the registers A1 and A2 each need to hold at least twelve bits. It will be recalled that the term "bit" is a contraction of the term "binary digit" and is used to designate a binary 1 or 0 digit or any expression of this digit in a data processing machine.

Register A1 102 is used either as a register for the temporary storage of an address in the memory 101 or as an ordinal counter, in which latter case it is used for the purpose of sequentially addressing the memory 101. The register A2 103 is also used as an address register and always contains the address at which the content is to be modified. The functions of registers A1 102 and A2 103 may of course be interchanged.

Registers IR 105 and D 106 are data registers which may be four, eight, sixteen or whatever bits in length depending upon the size of the words in the memory 101, which is defined on the basis of the kind of application in mind. The data registers IR 105 and D 106 are associated with address registers A1 102 and A2 103, respectively. An item of information or data which is to be read from memory 101 and which is addressed by register A1 102 is transferred from memory 101 to register IR 105; similarly, an item of information or data to be written which is contained in data register IR 105 is written at the address in the memory designated by register A1 102. The same two-way relationship exists between registers A2 103 and D 106.

In FIG. 1, the output 2 of register A1 102 is connected by BUS A1 to input 1 of memory 101, while the output 2 of register A2 103 is connected to input 2 of memory 101 by BUS A2. The data to be read from or written in memory 101 travels either along a BUS D1 which connects an input/output terminal 3 of memory 101 to an input/output terminal 1 of data register IR 105, or along a BUS D2 which connects an input/output terminal 4 of memory 101 to an input/output terminal 1 of data register D 106. The input/output terminal 2 of both data registers IR 105 and D 106 are connected to a data BUS D which communicates with the inputs 1 of both of the registers A1 102 and A2 103.

A processing and control unit 104 is responsible for synchronizing the data exchanges on BUS D and for addressing the memory 101, and its outputs 2 and 3 control the reading and writing of data from and in the registers A1 102, A2 103 and IR 105, D 106, respectively. Input 3 of each of the four registers A1 102, A2 103, IR 105 and D 106 may be acted on separately by the processing and control unit 104. Via its input 1, unit 104 communicates with the input/output (I/O) BUS for data which connects the microprocessor to external devices. The unit 104 input/output terminal 4 communicates with BUS D and is able to transfer data or information to any one of the four above-mentioned registers or to receive data from either of the two registers IR 105 and D 106. When data is being written in memory 101, the programming voltage $V_p$ is supplied by members external to the microprocessor.

The way in which the microprocessor operates is as follows. The processing program is contained in the memory 101. The modified item of data or instruction for this program is fed into register D 106 under the control of the program being processed by the pair of registers A1 102 and IR 105. The address concerned is fed into register A2 103. The program then branches to a sequence of writing at the appropriate address found in register A1 102, and it then checks that the writing has taken place under satisfactory conditions. Since writing in memories of the PROM and EPROM type takes a certain amount of time, it is necessary that the address and the item of data to be written be held stable at the input to the memory 101 during the whole of the write cycle. Consequently, the four registers need to be able to hold the data which they contain in store during at least the entire write cycle. This can be achieved by using latches which are intended to preserve information which appears temporarily on the bus to which they are connected, since in general the data applied to a bus is soon altered.

There are two aspects of the FIG. 1 embodiment which deserve comment:

(1) the circuits for access in the memory need to be complex since one and the same memory cell may be subject to two simultaneous and independent accesses; and (2) The structure allows a program to be self-destructive since, at a given moment, address A1 may be equal to address A2. This property may be made use of in applications which call for certain information to be safeguarded.

Figure 2:
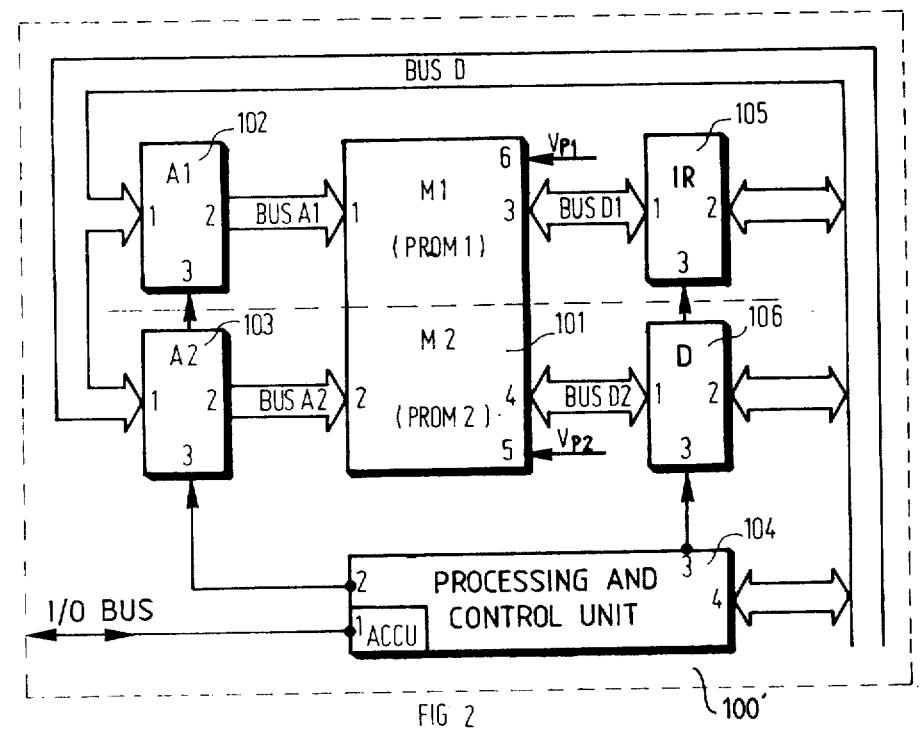
FIG. 2 is a modified embodiment of the structure shown in FIG. 1.

FIG. 2 shows a modified embodiment of the microprocessor, designated 100', which is much simpler. In FIG. 2, the PROM or EPROM memory 101 is divided into two memory blocks M1 and M2, memory block M1 being addressed by register A1 102 and memory block M2 being addressed by register A2 103. The division of the memory 101 into two memory blocks is substantially the only special feature of the embodiment shown in FIG. 2, the other elements being unaltered from corresponding ones of FIG. 1. The voltages $V_{p1}$ and $V_{p2}$ for programming the two memory blocks M1 and M2 are independent so that one block can be programmed by a program situated in the other.

The FIG. 2 structure gives the following advantages:

In the majority of applications it is possible to construct the program in such a way that memory block M1 contains all the non-evolving programs or parts of programs and block M2 contains the evolving programs or parts of programs. In an application of this kind memory block M1 can be produced in the form of a read-only memory (ROM) to reduce manufacturing costs and the physical area of this part of the memory; in this case there is no longer a write voltage $V_{p1}$. The second memory block M2 on the other hand must necessarily be in the form of a PROM or EPROM memory. It can thus be seen that in this case the problems of addressing are easily solved since a register for addressing one memory cannot address a memory element of the other memory.

Figure 3:
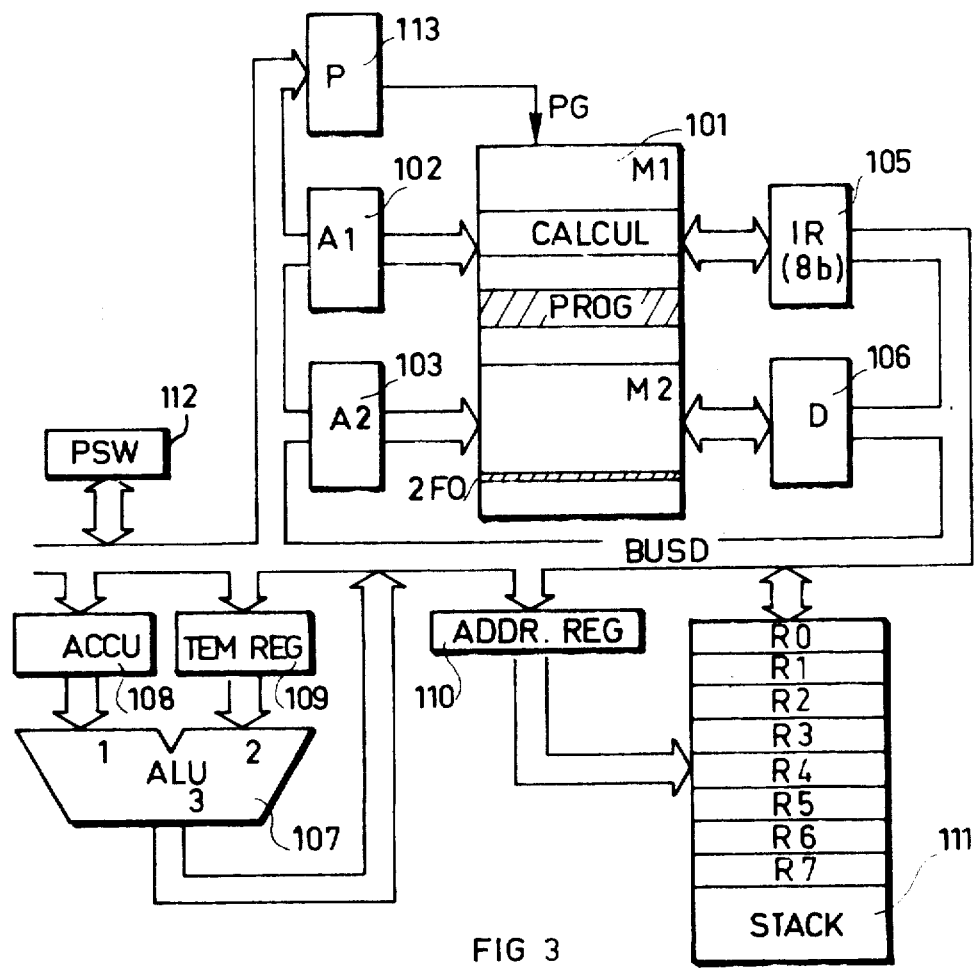
FIG. 3 shows a complete embodiment of the automatically programmed microprocessor according to the invention.

FIG. 3 shows a complete embodiment of the automatically programmed microprocessor according to the invention. All of the units which the microprocessor comprises are organized around the BUS D. As in FIG. 2, the memory unit 101 is divided into two blocks M1 and M2, M1 containing the non-evolving parts of programs and M2 containing the evolving program parts. Block M1 is addressed by the address register A1 102, which performs the function of the ordinal counter found in conventional microprocessors. Address register A1 102 is associated with the IR data register 105. Block M2 is addressed by address register A2 103 and is associated with the data register D 106. As in the previous examples, the memory blocks M1 and M2 are made up of non-volatile cells of the ROM, PROM and EPROM type. The programming voltage PG comes from a flip-flop P 113. The other items in FIG. 3 are taken over from the conventional architecture of a microcomputer.

A Program Status Word (PSW) register 112 is a specialized register which contains all the information required to execute a program. By storing a PSW word it is possible to preserve certain operating states of the microprocessor. Access to certain program information internal to the microprocessor will thus be forbidden to users of the microprocessor by privileged bit positions within the PSW word.

In conventional fashion, the microprocessor includes an arithmetic and logic unit (ALU) 107 whose inputs 1 and 2 are connected to an accumulating (ACCU) register or accumulator 108 and to a temporary storage register (TEM REG) 109, these two registers also being connected by their inputs to the data BUS D and to output 3 of the arithmetic and logic unit (ALU) 107. The microprocessor also includes a set 111 of working registers R0 to R7 and STACK which are addressed by an address register 110 whose input is also connected to the BUS D.

With this architecture, a program which is executed in blocks M1 and M2 of memory 101 modifies the information content of memory block M2. More particularly, if the program is to modify the memory content at an address 2FOH (i.e., the 752nd word in the memory) using the result of an operation situated in the accumulator 108, the program stores the address 2FOH beforehand in the working registers R0 and R1 of the set 111.

The automatic programming is performed by a subprogram called "PROG" which is stored in memory block M1. This sub-program PROG needs to perform all the functions required for writing in the memory 101 and, in particular, needs to use sequences which are compatible with the fabrication technology employed.

Figure 4:
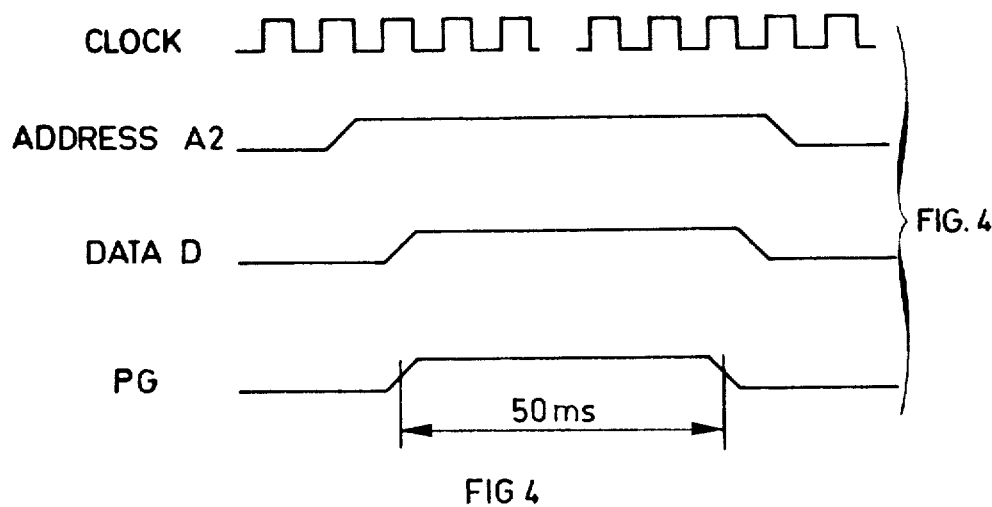
FIG. 4 is a diagram with respect to time showing the state of the various signals involved in a sequence of writing in the memory M2.

For programmable memories produced by MOS techniques, the required signal waveforms with respect to time are shown in FIG. 4. Specifically, FIG. 4 shows the waveform of the CLOCK (CK) signal, the period during which the address is held in the register A2 103 (ADDRESS A2), the period during which the item of data is held in D register 106 (DATA D), and the period during which the write signal PG transmitted by flip-flop P 113 is present. It will be realized that the item of data and the address in registers D 106 and A2 103 will have to be held in these registers for a period which is very long when compared with the microprocessor cycle. In fact, if the microprocessor cycle time is 5 μs, the address and the data item will need to remain stable during the whole of the write phase, i.e., for 50 ms.

Figure 5:
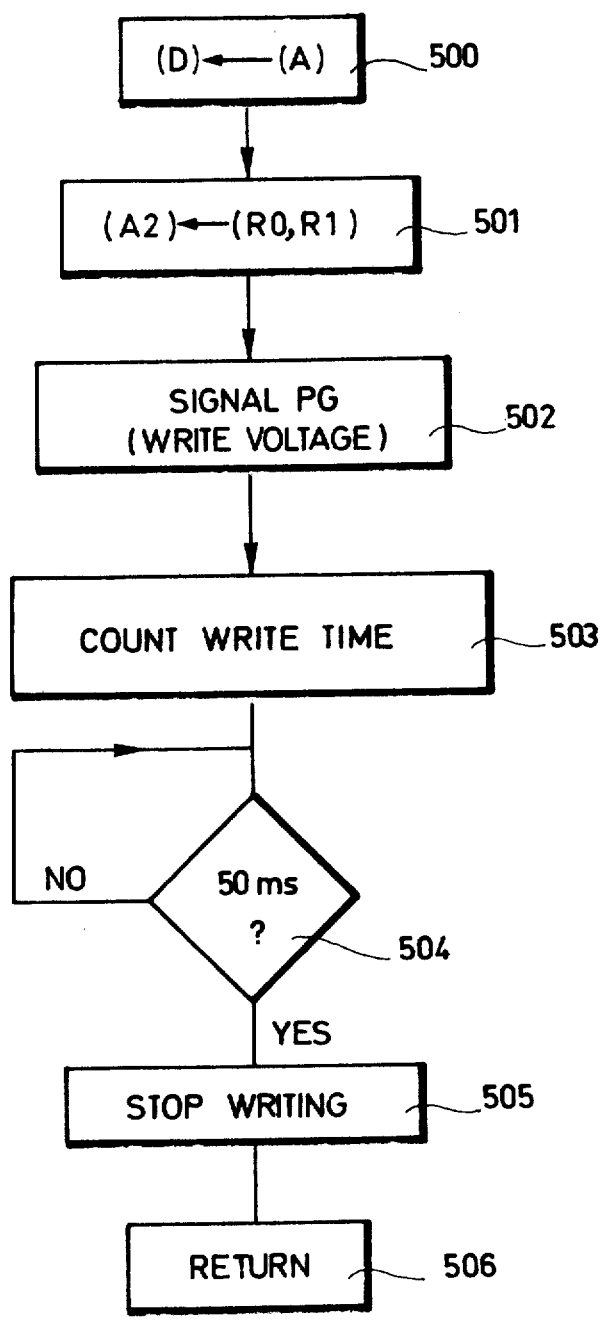
FIG. 5 is a simplified flow-chart of the processing stages executed by the write sub-program PROG.

FIG. 5 is a flow chart showing the steps of the program PROG. In step 500, the content of the accumulator 108 is loaded into the D register 106, the effect of which is to feed the modified item of data or information into the D register. In step 501, the content of registers R0 and R1 of set 111 is transferred to the address register A2 103, the effect of which is to introduce the address of the item of data or information to be modified into the address register A2 103. In step 502, flip-flop P 113 emits the signal PG to cause the modified item of data to be written in memory block M2. In step 503, a count is triggered to check the time required to write the data or information in memory block M2. The check takes place in step 504. In the example it was assumed that this time is 50 ms. At the end of the 50 ms period, writing is completed in step 505 and, in step 506, a return is made to the program which called up the sub-program PROG by finding the information required for this return in the stack registers.

An example of microinstructions for the execution of the sub-program PROG is the following:

|  | Microinstruction Mnemonics | Comments |
|---|---|---|
| PROG | MOVD,A | Load accumulator into D. |
|  | MOVA,R0 | Load R0 into accumulator. |
|  | MOVA2H,A | Load accumulator into upper part of register A2. |
|  | MOVA,R1 | Load R1 into accumulator. |
|  | MOVA2L,A |  |
|  | MOVA,#FFH | Load parameters required for counting time of 50 ms. |
|  | MOVR1,A |  |
|  | MOVA,28H |  |
|  | MOVR2,A |  |
|  | MOVA,#1H |  |
|  | OUTLP,A | Write order. Signal PG. |
| COMT | DJNZR1,Compt | Decrement register R1. |
|  | DJNZR2,Compt | Decrement register R2. |
|  | CLRA |  |
|  | OUTPA |  |
|  | RET | Stop writing. |

The running of the main program loads the parameters required to call up the program PROG, the list of microinstructions thus being:

| MOVA,#02H |  |
|---|---|
| MOVR0,A |  |
| MOVA,#F0H | Load address into R0, R1 |
| MOVR1,A |  |
| MOVA, # data | Load data to be modified into accumulator A. |
| CALL PROG |  |

From the foregoing, it will be seen that the content of registers A2 103 and D 106 remains stable during the whole of the write phase (signal PG) while the BUS D is used for the transfer of the instructions required for the running of the write program PROG.

Figure 6:
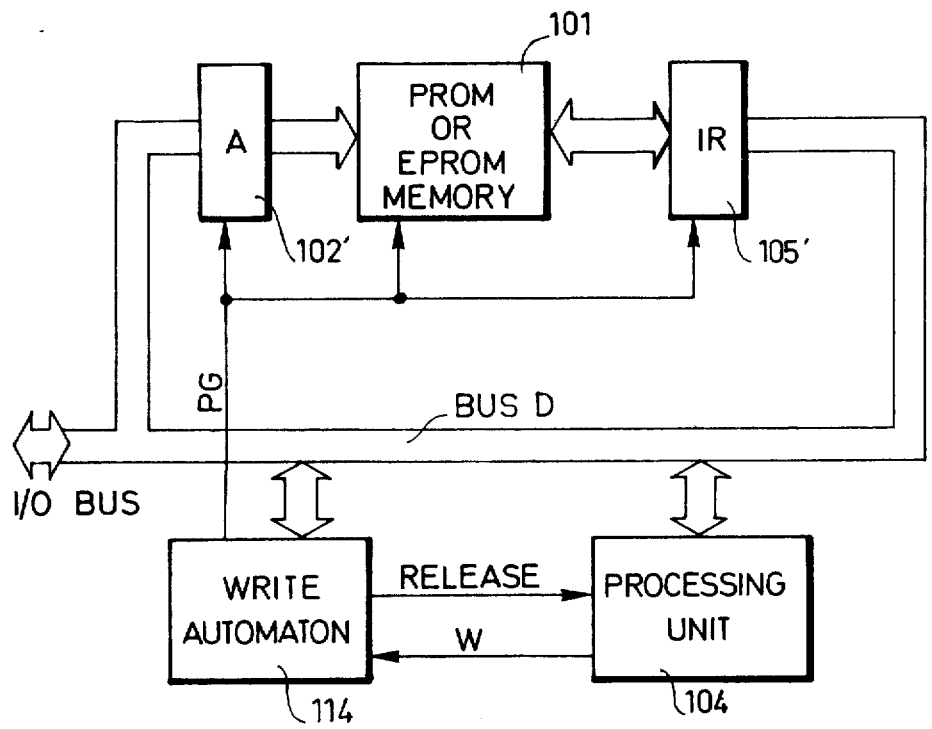
FIG. 6 shows a modified embodiment of the automatically programmed microprocessor according to the invention.

In another embodiment of the invention it is possible to replace the write program PROG by a write automaton produced entirely from logic circuits. The embodiments shown in FIG. 6 is a microprocessor structure which allows non-volatile automatic programming. In FIG. 6, the previously described write program PROG is replaced by a write automaton 114. The microprocessor described previously performed the function of non-volatile automatic programming by using simultaneous dual access to the PROM or EPROM memory by four registers which were associated in pairs and by using the appropriate program PROG. This function may also be performed by single access to a non-volatile memory which is automatically programmable by means of a single address register A 102', a single data register IR 105', and the write automaton 114.

The write automaton 114 is connected to the BUS D which, as before, connects the processing unit 104 to address register A 102' and data register IR 105'. The automaton 114 causes registers A 102' and IR 105' to be locked by emitting the signal PG for controlling the writing in the memory 101. The automaton is operated by a write instruction W (a microcode) which is emitted by the processing unit 104. When the write cycle in the PROM or EPROM memory 101 has been completed, the automatom 114 transmits a RELEASE signal to the processing unit 104, which resumes the current program which was interrupted during the write cycle. The automaton 114 thus allows the write voltage (signal PG) to be distributed in such a way as not to interfere with the normal operation of the microprocessor. Data register IR 105' is bi-directional, that is to say it needs to be able to contain data read from and to be written in the PROM memory 101. Register A 102' is multiplexed onto the BUS D between the write automaton 114 and the processing unit 104.

In the processing phase, register A 102' is loaded by an ordinal counter in the processing unit 104 and register IR 105' is used as a register for reading instructions and data from the PROM memory 101.

In the automatic programming phase, the processing unit 104 hands control over to the write automaton 114 by emitting the microcode W. The automaton 114 generates the requisite write sequence which is compatible with the fabrication technology of the PROM memory 101 used. The data or instructions to be modified are fed in by register R 105'. At the end of the write sequence, control is returned to the processing unit 104, which resumes the normal running of the program so modified. The content of register A 102' is then reset either by the write automaton 114 or by the processing unit 104.

Figure 7:
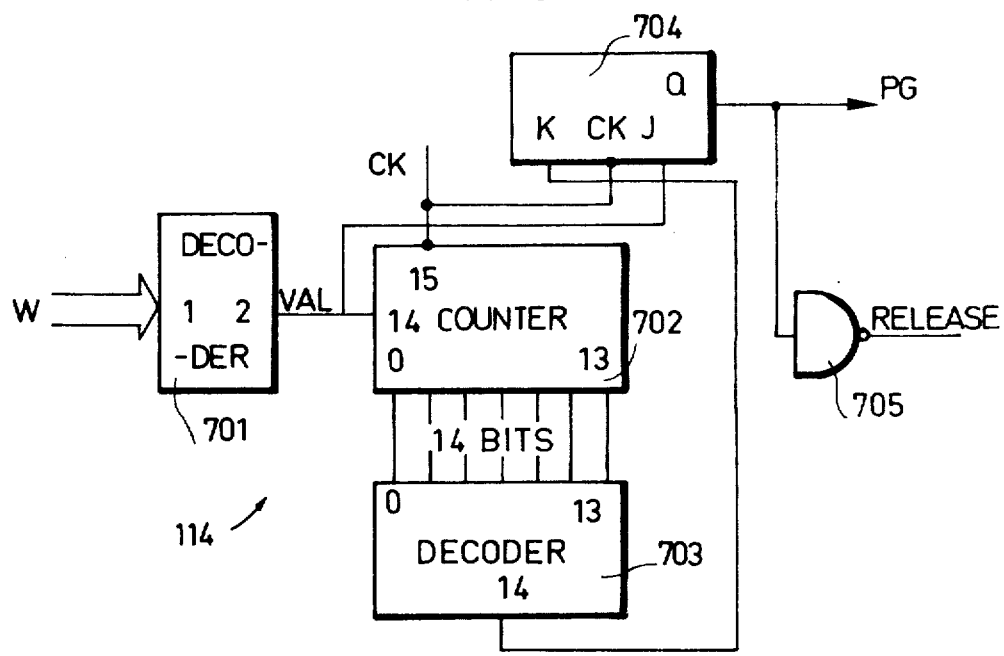
FIG. 7 shows an embodiment of the write automaton used in the embodiment of microprocessor shown in FIG. 6.

FIG. 7 shows an embodiment of the write automaton 114. The signal for the write microcode W is fed in at input 1 of a decoder 701 which transmits from its output 2 a validating signal VAL to input 14 of a counter 702 to allow the counter 702 to count in step with the microprocessor clock signals CK which are applied to its input 15. If, as in the embodiment of FIG. 4, the microprocessor cycle time is 5 μs and the write cycle time is 50 ms, the counter 702 requires fourteen flip-flops in order to count microprocessor cycle periods for 50 ms (10,000 microprocessor cycles).

Counter 702 has an output decoder 703 whose output 14 signals the K input of a J-K flip-flop 704 when 10,000 cycles have been counted. The Q output of the J-K flip-flop 704 emits the write controlling signal PG. This flip-flop 704 is set to the "binary 1" state when signal VAL is present on the J input and is reset to "binary 0" when the counting capacity of 10,000 is reached. The cycle RELEASE signal is emitted by an inverter 705 whose input is connected to the Q output of the J-K flip-flop 704.

The example which has just been given of a preferred embodiment of the invention is in no way limiting and it is perfectly clear that a person skilled in the art of microprocessors could design other embodiments of the invention without thereby departing from its scope.

What is claimed is:

1. A microprocessor comprising, on a single semiconductor chip,
    a programmable read-only memory;
    processing unit means for processing information contained in said programmable read-only memory; and
    means controlled by said processing unit means for enabling data to be written in said programmable read-only memory.

2. A microprocessor according to claim 1, wherein said means for enabling data to be written in said programmable read-only memory comprises:
    a write automaton controlled by said processing unit means; and
    address and data registers for transferring information between said processing unit means and said write automaton, said address and data registers including means for holding data stable whenever said automaton is operated by said processing unit.

3. A microprocessor according to claim 2, wherein said write automaton includes means for transmitting a release signal to said processing unit at the conclusion of a programmable memory write cycle to enable said processing unit to resume an interrupted program.

4. A microprocessor comprising, on a single semiconductor chip,
    a programmable read-only memory;
    processing unit means for processing information contained in said programmable read-only memory;
    means controlled by said processing unit means for enabling data to be written in said programmable read-only memory;
    said means for enabling data to be written in said programmable read-only memory comprising means for simultaneously addressing a location in said programmable read-only memory at which data is to be modified, and data stored in said programmable read-only memory in the form of an instruction sequence which enables modified data to be written in said programmable read-only memory.

5. A microprocessor according to claim 4, wherein said means for simultaneously addressing comprises:
    a first address register for addressing the location at which data is to be modified; and
    a second address register for use by said instruction sequence.

6. A microprocessor according to claim 5, wherein said means for simultaneously addressing further comprises:
    a first data register for storing modified data; and
    a second data register for storing data required to execute said instruction sequence.

7. A microprocessor according to claim 4 wherein said means for enabling data to be written in said programmable read-only memory further comprises means for generating the voltage required to write data in said programable read-only memory during the entire time required by the particular programmable read-only memory.

8. A microprocessor according to claim 4, wherein said means for enabling data to be written in said programmable read-only memory comprises:
    a write automaton controlled by said processing unit means; and
    address and data registers for transferring information between said processing unit means and said write automaton, said address and data registers including means for holding data stable whenever said automaton is operated by said processing unit.

9. A microprocessor according to claim 8, wherein said write automaton includes means for transmitting a release signal to said processing unit at the conclusion of a programmable memory write cycle to enable said processing unit to resume an interrupted program.

10. A microprocessor comprising, on a single semiconductor chip, a memory means, processing unit means for processing information contained in said memory, means controlled by said processing unit means for enabling data to be written in said memory, said means for enabling data to be written in said memory comprising means for simultaneously addressing a location in said memory at which data is to be modified, and data stored in said memory in the form of an instruction sequence which enables modified data to be written in said memory.

11. A microprocessor according to claim 10 wherein said memory means comprises a read-only memory for storing data stored in the form of an instruction sequence and a programmable read-only memory for storing the data which can be modified.

12. A microprocessor according to claim 10 where in said means for simultaneously addressing comprises a first address register for addressing the location at which data is to be modified, and a second address register for use by said instruction sequence.

13. A microprocessor according to claim 16 wherein said means for enabling data to be written in said memory means comprises a write automaton controlled by said processing unit means, and address and data registers for transferring information between said processing unit means and said write automaton, said address and data registers including means for holding data stable whenever said automaton is operated by said processing unit.

14. A microprocessor according to claim 13, where in said write automaton includes means for transmitting a release signal to said processing unit at the conclusion of a memory write cycle to enable said processing unit to resume an interrupted program.

* * * * *

UNITED STATES PATENT AND TRADEMARK OFFICE
CERTIFICATE OF CORRECTION

PATENT NO. : 4,382,279
DATED : May 3, 1983
INVENTOR(S) : Michel UGON

It is certified that error appears in the above-identified patent and that said Letters Patent are hereby corrected as shown below:

Claim 13, column 10, line 50, delete "16" and substitute --10--.

Claim 13, column 10, line 53, after "unit means," insert --and a write automaton controlled by said processing unit means,--.

Signed and Sealed this

Thirtieth Day of August 1983

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,382,279
DATED : May 3, 1983
INVENTOR(S) : Michel UGON

It is certified that error appears in the above-identified patent and that said Letters Patent is hereby corrected as shown below:

Claim 4, column 9, line 54, after "modified" delete the comma ",".

Claim 10, column 10, line 36, after "modified" delete the comma ",".

Claim 13, column 10, line 50, delete "16" and substitute --10--.

This certificate supersedes Certificate of Correction issued August 30, 1983.

Signed and Sealed this

Tenth Day of June 1986

[SEAL]

Attest:

DONALD J. QUIGG

Attesting Officer     Commissioner of Patents and Trademarks